US009361679B2

(12) United States Patent
Aydin et al.

(10) Patent No.: US 9,361,679 B2
(45) Date of Patent: Jun. 7, 2016

(54) TEMPORALLY COHERENT LOCAL TONE MAPPING OF HDR VIDEO

(71) Applicant: Disney Enterprises, Inc., Burbank, CA (US)

(72) Inventors: Tunc Ozan Aydin, Zurich (CH); Simone Croci, Mendrisio (CH); Aljosa Aleksej Andrej Smolic, Aargau (CH); Nikolce Stefanoski, Zurich (CH); Markus Gross, Zurich (CH)

(73) Assignees: Disney Enterprises, Inc., Burbank, CA (US); ETH Zurich (Eidgenoessische Technische Hochschule Zurich), Zurich (CH)

( * ) Notice: Subject to any disclaimer, the term of this patent is extended or adjusted under 35 U.S.C. 154(b) by 0 days.

(21) Appl. No.: 14/121,091

(22) Filed: Jul. 28, 2014

(65) Prior Publication Data

US 2016/0027161 A1    Jan. 28, 2016

(51) Int. Cl.
| | |
|---|---|
| *G06K 9/40* | (2006.01) |
| *G06T 5/40* | (2006.01) |
| *G06T 7/00* | (2006.01) |
| *H04N 19/117* | (2014.01) |

(52) U.S. Cl.
CPC ................. *G06T 5/40* (2013.01); *G06T 7/0016* (2013.01); *G06T 2207/10016* (2013.01); *G06T 2207/10024* (2013.01); *G06T 2207/20024* (2013.01); *G06T 2207/20182* (2013.01); *G06T 2207/20208* (2013.01); *H04N 19/117* (2014.11)

(58) Field of Classification Search
CPC ............ G06T 5/40; G06T 2207/20208; G06T 2207/10024; G06T 2207/10016; G06T 2207/20182; G06T 2207/20024; G06T 7/0016; H04N 19/117
USPC .................................................. 382/260, 266
See application file for complete search history.

(56) References Cited

U.S. PATENT DOCUMENTS

| | | | | |
|---|---|---|---|---|
| 7,295,616 B2 * | 11/2007 | Sun | .......................... | H04N 5/21 348/E5.077 |
| 7,542,622 B1 * | 6/2009 | Angelini | .................. | G06K 9/40 382/275 |
| 7,760,911 B2 * | 7/2010 | Xiao | ...................... | G06T 7/2006 348/162 |
| 2009/0278961 A1 * | 11/2009 | Mohanty | .................... | G06T 5/50 348/241 |
| 2010/0245670 A1 * | 9/2010 | Takeda | ...................... | G06T 3/40 348/607 |
| 2011/0019082 A1 * | 1/2011 | Su | ........................... | G06T 5/002 348/441 |
| 2011/0085084 A1 * | 4/2011 | Jain | ......................... | G06T 5/002 348/598 |

\* cited by examiner

*Primary Examiner* — Kanjibhai Patel
(74) *Attorney, Agent, or Firm* — Patterson + LLP

(57) ABSTRACT

Approaches are described for filtering a first image frame in a sequence of image frames. A tone-mapping pipeline applies a spatiotemporal filter to each pixel of the first image frame, based on a forward optical flow and a backward optical flow, to produce a base layer image. The tone-mapping pipeline applies a temporal filter to each pixel of the first image frame, based on the forward optical flow and the backward optical flow, to produce a temporally filtered frame. The tone-mapping pipeline produces a detail layer image based on the base layer image and the temporally filtered frame.

17 Claims, 6 Drawing Sheets
(3 of 6 Drawing Sheet(s) Filed in Color)

TEMPORALLY COHERENT LOCAL TONE MAPPING OF HDR VIDEO

BACKGROUND

1. Field

The present application relates to the field of image processing and, in particular, to temporally coherent local tone mapping of high dynamic range video.

2. Description of the Related Art

New moving image technologies for video and film have enhanced user experience via increased spatial resolution formats, such as high-definition and 4K, increased temporal resolution, such as 48 frames per second and higher for cinematic releases, and stereoscopic three-dimensional (3D) imagery, where depth provides an additional dimension. While image fidelity has advanced in terms of spatial resolution, temporal resolution, and depth, the dynamic range of moving images has received relatively little attention until recently. High-end cameras are now becoming available that are capable of capturing high dynamic range (HDR) video natively, at up to 16 f-stops of range.

However, consumer-level HDR display technology, capable of reproducing the full dynamic range of captured HDR video, is not yet available. Consequently, HDR images are typically processed before the images are distributed to and displayed by consumer devices, in order to accommodate the restricted capability of current consumer displays. One approach, as used in still photography, is tone mapping. With tone mapping, chromaticity and luminance from the source image are mapped to a more limited chromaticity and luminance set in the destination image in order to preserve some of the beneficial qualities of the original HDR imagery, while accommodating the limited dynamic range of consumer displays. In some cases, an HDR image is separated into a "base layer" image and a "detail layer" image which are compressed separately and then later recombined. One potential drawback with this approach is that tone mapping techniques from still imagery do not account for the temporal nature of video and film, leading to undesirable temporal artifacts. Another potential drawback with this approach is that the decomposition process results in undesirable "halo" effects that are not adequately eliminated with current techniques. As a result, such approaches are currently not capable of reproducing high-quality HDR moving images for display on consumer-level displays without introducing undesirable artifacts.

SUMMARY

One embodiment sets forth a method for filtering a first image frame in a sequence of image frames. The method includes applying a spatiotemporal filter to each pixel of the first image frame, based on a forward optical flow and a backward optical flow, to produce a base layer image. The method further includes applying a first temporal filter to each pixel of the first image frame, based on the forward optical flow and the backward optical flow, to produce a temporally filtered frame. The method further includes producing a detail layer image based on the base layer image and the temporally filtered frame.

Another embodiment sets forth a method for tone-mapping a first image frame in a sequence of image frames. The method includes applying a spatiotemporal filter to each pixel of the first image frame, based on a forward optical flow and a backward optical flow, to produce a base layer image. The method further includes applying a temporal filter to each pixel of the first image frame, based on the forward optical flow and the backward optical flow, to produce a temporally filtered frame. The method further includes producing a detail layer image based on the base layer image and the temporally filtered frame. The method further includes applying a first tone curve to the base layer image to produce a tone-mapped base layer image. The method further includes applying a second tone curve to the detail layer image to produce a tone-mapped detail layer image. The method further includes combining the tone-mapped base layer image with the tone-mapped detail layer image to produce a tone-mapped image frame.

Other embodiments include, without limitation, a computer-readable medium that includes instructions that enable a processing unit to implement one or more aspects of the disclosed methods. Other embodiments include, without limitation, a subsystem that includes a processing unit configured to implement one or more aspects of the disclosed methods as well as a computing system configured to implement one or more aspects of the disclosed methods.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

So that the manner in which the above recited features of the application can be understood in detail, a more particular description of the application, briefly summarized above, may be had by reference to embodiments, some of which are illustrated in the appended drawings. It is to be noted, however, that the appended drawings illustrate only typical embodiments of this application and are therefore not to be considered limiting of its scope, for the application may admit to other equally effective embodiments.

DETAILED DESCRIPTION

Figure 1:
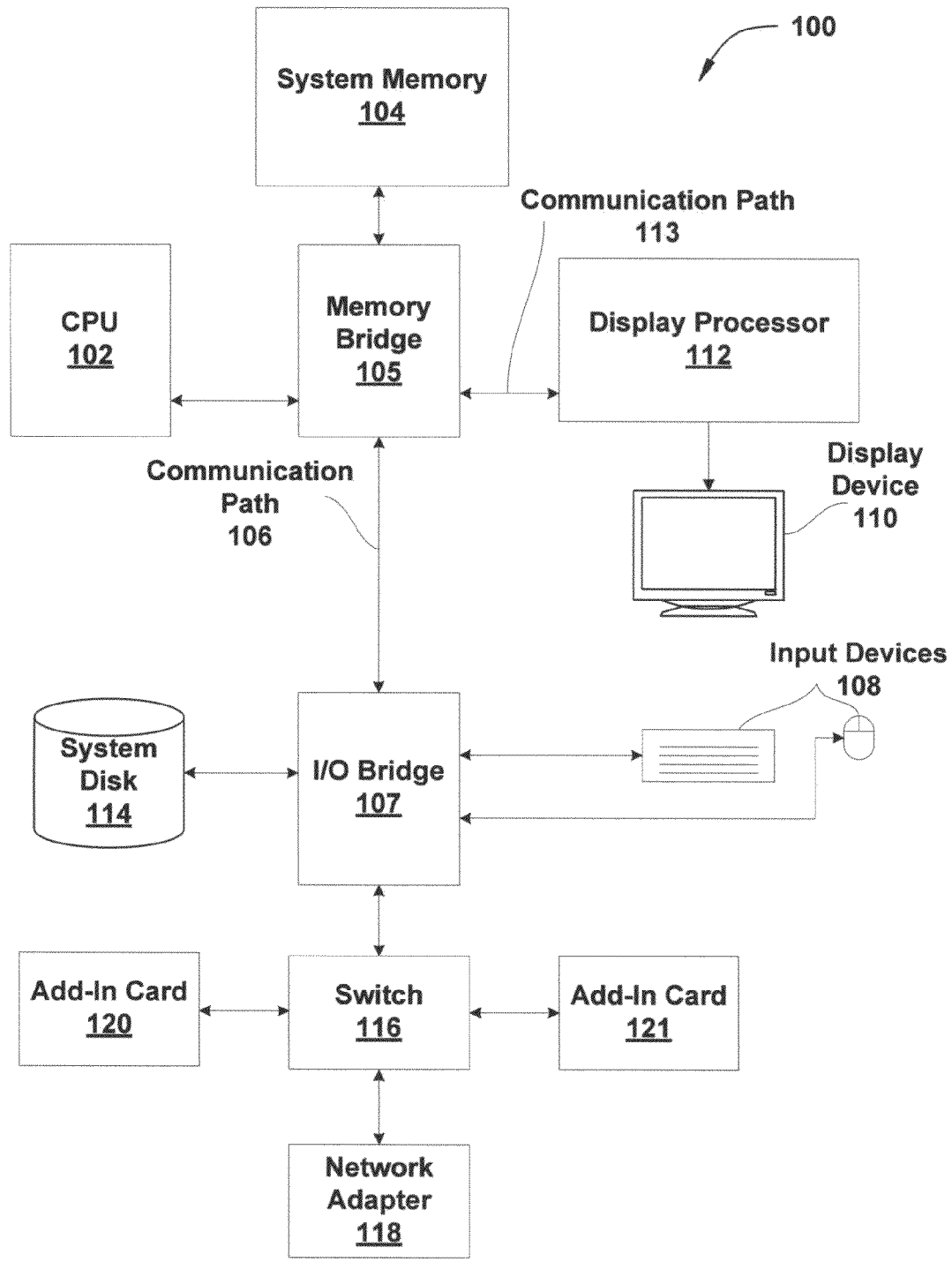
FIG. 1 depicts one architecture of a system within which embodiments of the present application may be implemented.

In the following, reference is made to some embodiments. However, it should be understood that the application is not limited to specific described embodiments. Instead, any combination of the following features and elements, whether related to different embodiments or not, is contemplated to implement and practice the application. Furthermore, although embodiments of the application may achieve advantages over other possible solutions and/or over the prior art, whether or not a particular advantage is achieved by a given embodiment is not limiting of the application. Thus, the following aspects, features, embodiments and advantages are merely illustrative and are not considered elements or limitations of the appended claims except where explicitly recited in a claim(s).

As will be appreciated by one skilled in the art, aspects of the present application may be embodied as a system, method or computer program product. Accordingly, aspects of the present application may take the form of an entirely hardware embodiment, an entirely software embodiment (including firmware, resident software, micro-code, etc.) or an embodiment combining software and hardware aspects that may all generally be referred to herein as a "circuit," "module," or "system." Furthermore, aspects of the present application may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present application may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present application are described below with reference to flowchart illustrations and/or block diagrams of methods, apparatus (systems) and computer program products. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks. Such computer, other programmable apparatus or other device may include, without limitation, a personal computer, video game console, personal digital assistant, rendering engine, mobile device, or dedicated hardware platform, such as a very large scale integrated (VLSI) circuit, a field-programmable gate array (FPGA), or an application specific integrated circuit (ASIC).

Hardware Overview

FIG. 1 depicts one architecture of a system 100 within which embodiments of the present application may be implemented. This figure in no way limits or is intended to limit the scope of the present application.

System 100 may be a personal computer, video game console, personal digital assistant, rendering engine, or any other device suitable for practicing one or more embodiments of the present application.

As shown, system 100 includes a central processing unit (CPU) 102 and a system memory 104 communicating via a bus path that may include a memory bridge 105. CPU 102 includes one or more processing cores, and, in operation, CPU 102 is the master processor of system 100, controlling and coordinating operations of other system components. System memory 104 stores software applications and data for use by CPU 102. CPU 102 runs software applications and optionally an operating system. Memory bridge 105, which may be, e.g., a Northbridge chip, is connected via a bus or other communication path (e.g., a HyperTransport link) to an I/O (input/output) bridge 107. I/O bridge 107, which may be, e.g., a Southbridge chip, receives user input from one or more user input devices 108 (e.g., keyboard, mouse, joystick, digitizer tablets, touch pads, touch screens, still or video cameras, motion sensors, and/or microphones) and forwards the input to CPU 102 via memory bridge 105.

A display processor 112 is coupled to memory bridge 105 via a bus or other communication path (e.g., a PCI Express, Accelerated Graphics Port, or HyperTransport link); in one embodiment display processor 112 is a graphics subsystem that includes at least one graphics processing unit (GPU) and graphics memory. Graphics memory includes a display memory (e.g., a frame buffer) used for storing pixel data for each pixel of an output image. Graphics memory can be integrated in the same device as the GPU, connected as a separate device with the GPU, and/or implemented within system memory 104.

Display processor 112 periodically delivers pixels to a display device 110 (e.g., a screen or conventional CRT, plasma, OLED, SED or LCD based monitor or television). Additionally, display processor 112 may output pixels to film recorders adapted to reproduce computer generated images on photographic film. Display processor 112 can provide display device 110 with an analog or digital signal.

A system disk 114 is also connected to I/O bridge 107 and may be configured to store content and applications and data for use by CPU 102 and display processor 112. System disk 114 provides non-volatile storage for applications and data and may include fixed or removable hard disk drives, flash memory devices, and CD-ROM, DVD-ROM, Blu-ray, HD-DVD, or other magnetic, optical, or solid state storage devices.

A switch 116 provides connections between I/O bridge 107 and other components such as a network adapter 118 and various add-in cards 120 and 121. Network adapter 118 allows system 100 to communicate with other systems via an electronic communications network, and may include wired or wireless communication over local area networks and wide area networks such as the Internet.

Other components (not shown), including USB or other port connections, film recording devices, and the like, may also be connected to I/O bridge 107. For example, an audio processor may be used to generate analog or digital audio output from instructions and/or data provided by CPU 102, system memory 104, or system disk 114. Communication paths interconnecting the various components in FIG. 1 may be implemented using any suitable protocols, such as PCI (Peripheral Component Interconnect), PCI Express (PCI-E), AGP (Accelerated Graphics Port), HyperTransport, or any other bus or point-to-point communication protocol(s), and connections between different devices may use different protocols, as is known in the art.

In one embodiment, display processor 112 incorporates circuitry optimized for graphics and video processing, including, for example, video output circuitry, and constitutes a graphics processing unit (GPU). In another embodiment, display processor 112 incorporates circuitry optimized for general purpose processing. In yet another embodiment, display processor 112 may be integrated with one or more other system elements, such as the memory bridge 105, CPU 102, and I/O bridge 107 to form a system on chip (SoC). In still further embodiments, display processor 112 is omitted and software executed by CPU 102 performs the functions of display processor 112.

Pixel data can be provided to display processor 112 directly from CPU 102. In some embodiments of the present application, instructions and/or data representing a scene are provided to a render farm or a set of server computers, each similar to system 100, via network adapter 118 or system disk 114. The render farm generates one or more rendered images of the scene using the provided instructions and/or data. These rendered images may be stored on computer-readable media in a digital format and optionally returned to system 100 for display. Similarly, stereo image pairs or multiview autostereoscopic images processed by display processor 112 may be output to other systems for display, stored in system disk 114, or stored on computer-readable media in a digital format.

Alternatively, CPU 102 provides display processor 112 with data and/or instructions defining the desired output images, from which display processor 112 generates the pixel data of one or more output images, including characterizing and/or adjusting the offset between stereo image pairs, in the case of stereoscopic images, or generating and interleaving multiple views, in the case of multiview autostereoscopic images. The data and/or instructions defining the desired output images can be stored in system memory 104 or graphics memory within display processor 112. For example, CPU 102 could execute a client media player application (not shown) that receives a media stream from a content provider, and transmits the media stream to the display processor 112 for viewing on the display device 110. In an embodiment, display processor 112 includes 3D rendering capabilities for generating pixel data for output images from instructions and data defining the geometry, lighting shading, texturing, motion, and/or camera parameters for a scene. Display processor 112 can further include one or more programmable execution units capable of executing shader programs, tone mapping programs, and the like.

CPU 102, render farm, and/or display processor 112 can employ any surface or volume rendering technique known in the art to create one or more rendered images from the provided data and instructions, including rasterization, scanline rendering REYES or micropolygon rendering, ray casting, ray tracing, image-based rendering techniques, and/or combinations of these and any other rendering or image processing techniques known in the art.

It will be appreciated that the system shown herein is illustrative and that variations and modifications are possible. The connection topology, including the number and arrangement of bridges, may be modified as desired. For instance, in some embodiments, system memory 104 is connected to CPU 102 directly rather than through a bridge, and other devices communicate with system memory 104 via memory bridge 105 and CPU 102. In other alternative topologies, display processor 112 is connected to I/O bridge 107 or directly to CPU 102, rather than to memory bridge 105. In still other embodiments, I/O bridge 107 and memory bridge 105 might be integrated into a single chip. The particular components shown herein are optional; for instance, any number of add-in cards or peripheral devices might be supported. In some embodiments, switch 116 is eliminated, and network adapter 118 and add-in cards 120, 121 connect directly to I/O bridge 107.

Tone-Mapping Pipeline

Prior tone mapping operators (TMOs) generally either produce disturbing temporal artifacts, or are limited in contrast reproduction ability. The HDR video tone mapping operator disclosed herein addresses both of these issues, reduces the dynamic range of the input video, and simultaneously preserves fine scale contrast without causing significant visual artifacts. The tone mapping approach described herein employs a temporally filtered detail layer and a spatiotemporally filtered base layer. The base layer is compressed to reduce the input dynamic range while preserving local details. High quality edge-aware filtering is efficiently achieved via an iterative filtering approach that approximates a global solution. In one aspect, the disclosed approaches produce improved local tone mapping results, even on challenging scenes that present complex motion and varying illumination. In another aspect, the disclosed approaches enhance fine and coarse scale details, and produce improved results for low light video sequences that include significant camera noise. As further described herein, the disclosed temporally coherent and local video tone mapping approach maintains a high level of local contrast with fewer temporal artifacts compared to the state-of-the-art. Also described herein is a practical and efficiently parallelizable filtering approach for tone mapping, which reduces halo artifacts by approximating a global solution through iterative application.

Figure 2:
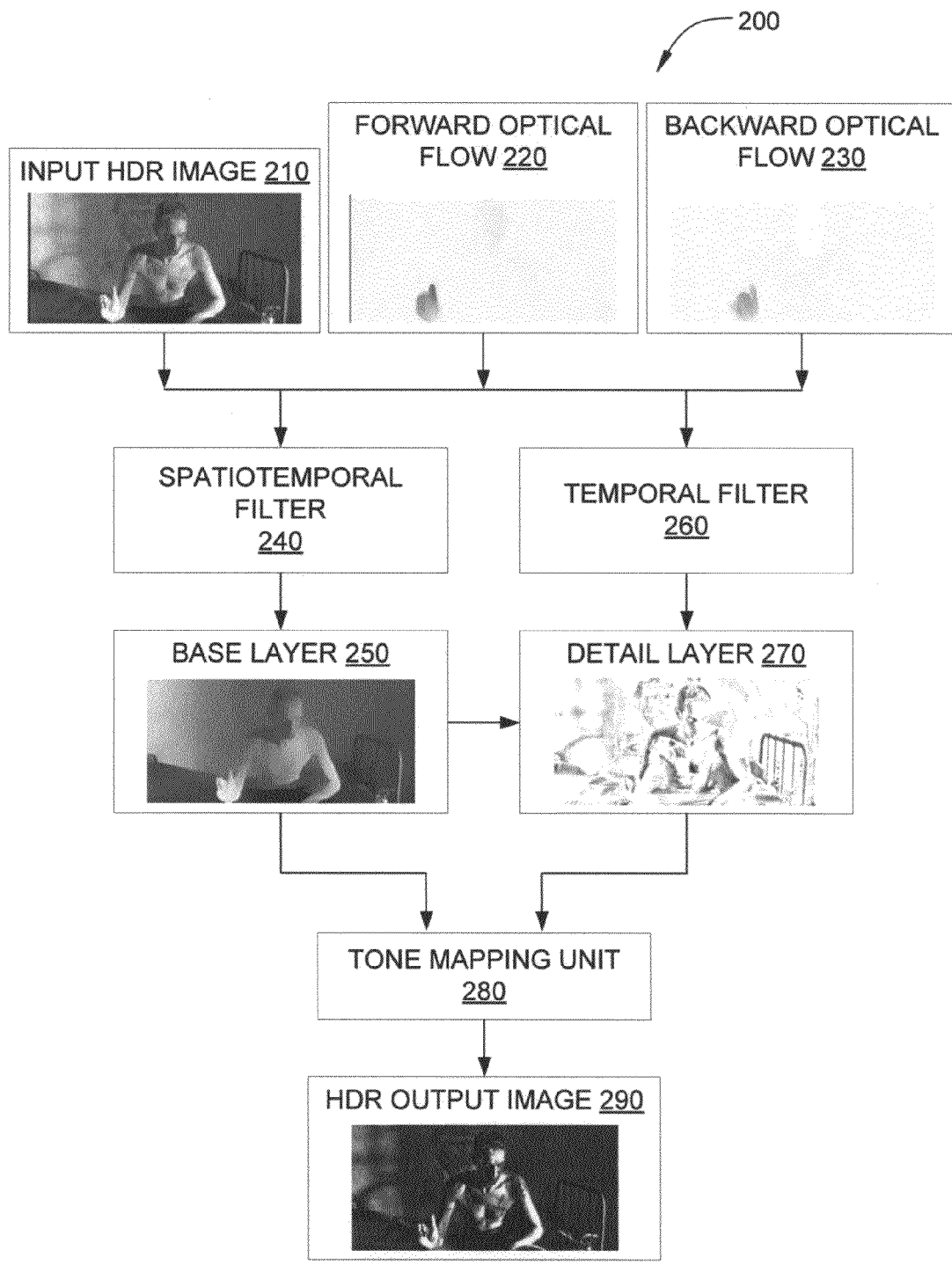
FIG. 2 illustrates a tone-mapping pipeline as implemented within the computer system of FIG. 1, according to one embodiment.

FIG. 2 illustrates a tone-mapping pipeline 200 as implemented within the computer system of FIG. 1, according to one embodiment. As shown, the tone-mapping pipeline 200 includes an input HDR image 210, a forward optical flow 220, a backward optical flow 230, a spatiotemporal filter 240, a base layer 250, a temporal filter 260, a detail layer 270, a tone mapping unit 280, and an output HDR image 290. The base layer 250 and detail layer 270 are also referred to herein as the base layer image and detail layer image, respectively The input HDR image 210 is a single frame of video from an HDR image sequence, such as an HDR video or film clip. The tone-mapping pipeline 200 processes each input HDR image in the HDR image sequence, one at a time. Each input HDR image 210 is transmitted to the spatiotemporal filter 240 and the temporal filter 260 for further processing.

The forward optical flow 220 estimates motion vectors that point from each pixel in the input HDR image 210 to the corresponding pixels one or more future frames. The motion vectors in the forward optical flow 220 enable the spatiotemporal filter 240 and the temporal filter 260 to follow the motion path of each pixel in the input HDR image 210 forward in time, in order to appropriately apply temporal filtering in the forward direction. The forward optical flow 220 is transmitted to the spatiotemporal filter 240 and the temporal filter 260 for further processing.

The backward optical flow 230 estimates motion vectors that point from each pixel in the input HDR image 210 to the corresponding pixels in one or more previous frames. The motion vectors in the backward optical flow 230 enable the spatiotemporal filter 240 and the temporal filter 260 to follow the motion path of each pixel in the input HDR image 210 backward in time, in order to appropriately apply temporal filtering in the reverse direction. The backward optical flow 230 is transmitted to the spatiotemporal filter 240 and the temporal filter 260 for further processing.

The spatiotemporal filter 240 receives the input HDR image 210, the forward optical flow 220, and the backward optical flow 230, and applies both spatial and temporal filtering to the input HDR image 210. The spatiotemporal filter 240 applies spatial filtering to each pixel in the input HDR image 210 by determining a spatially local neighborhood defined by pixel locations on a uniform grid. The spatially local neighborhood for a given pixel is defined as a set of two or more pixels that are spatially near the given pixel. The spatiotemporal filter 240 also applies temporal filtering to each pixel in the input HDR image 210 by determining a temporally local neighborhood based on the motion vectors in the forward optical flow 220 and the backward optical flow 230. The spatiotemporal filter 240 warps the images in the temporal neighborhood of the input HDR image 210, such that the pixels of the input HDR image 210 and the corresponding pixels in the temporal neighborhood are aligned on a straight line in the time dimension. The temporal filtering proceeds if the temporal alignment is predicted to be reliable. In this way, the spatiotemporal filter 240 enhances temporal consistency while minimizing ghosting. After completing spatial and temporal filtering of the input HDR image 210, the spatiotemporal filter 240 produces a base layer 250.

The base layer 250 is produced by applying spatiotemporal filtering to the input HDR image 210. In general, the base layer 250 includes lower frequency components of the input HDR image 210. Because of the application of edge-aware filtering, as described herein, the base layer 250, in some embodiments, also includes strong image edges that entail low and high frequency components. The base layer 250 is transmitted to the tone mapping unit 280.

The temporal filter 260 receives the input HDR image 210, the forward optical flow 220, and the backward optical flow 230, and applies temporal filtering to the input HDR image 210. The temporal filter 260 applies temporal filtering to each pixel in the input HDR image 210 by determining a temporally local neighborhood based on the motion vectors in the forward optical flow 220 and the backward optical flow 230. The temporal filter 260 warps the images in the temporal neighborhood of the input HDR image 210, such that the pixels of the input HDR image 210 and the corresponding pixels in the temporal neighborhood are aligned on a straight line in the time dimension. The temporal filtering proceeds if the temporal alignment is predicted to be reliable. In this way, the temporal filter 260 enhances temporal consistency while minimizing ghosting. After completing temporal filtering of the input HDR image 210, the temporal filter 260 produces a detail layer 270.

The detail layer 270 is produced by applying temporal filtering to the input HDR image 210. In general, the detail layer 270 includes higher frequency components of the input HDR image 210. The detail layer 270 is transmitted to the tone mapping unit 280.

The tone mapping unit 280 receives the base layer 250 and the detail layer 270. The tone mapping unit 280 independently compresses the dynamic range of the detail layer 270 and the base layer 250. As a result, significant dynamic range reduction is achieved while the preserving scene detail within the detail layer 270. In some embodiments, the tone mapping unit may apply a tone curve to the base layer 250 and the detail layer 270 as follows. The tone mapping unit 280 may multiply the log luminance of the base layer by a compression factor c, where c is typically between 0.1 and 0.5, for emphasizing local contrast. The tone mapping unit 280 may then add the result of the multiply operation to the detail layer 270. The tone mapping unit 280 may then transform the result of the add operation from the log domain back to the linear domain, producing the final tone-mapped output HDR image 290. In other embodiments, the tone mapping unit 280 may apply any technically feasible compressive tone curve to the base layer 250 and the detail layer 270, whether or not the tone curve is based on logarithmic compression. The selection of an appropriate compressive tone curve may be based on artistic preferences.

Figure 3:
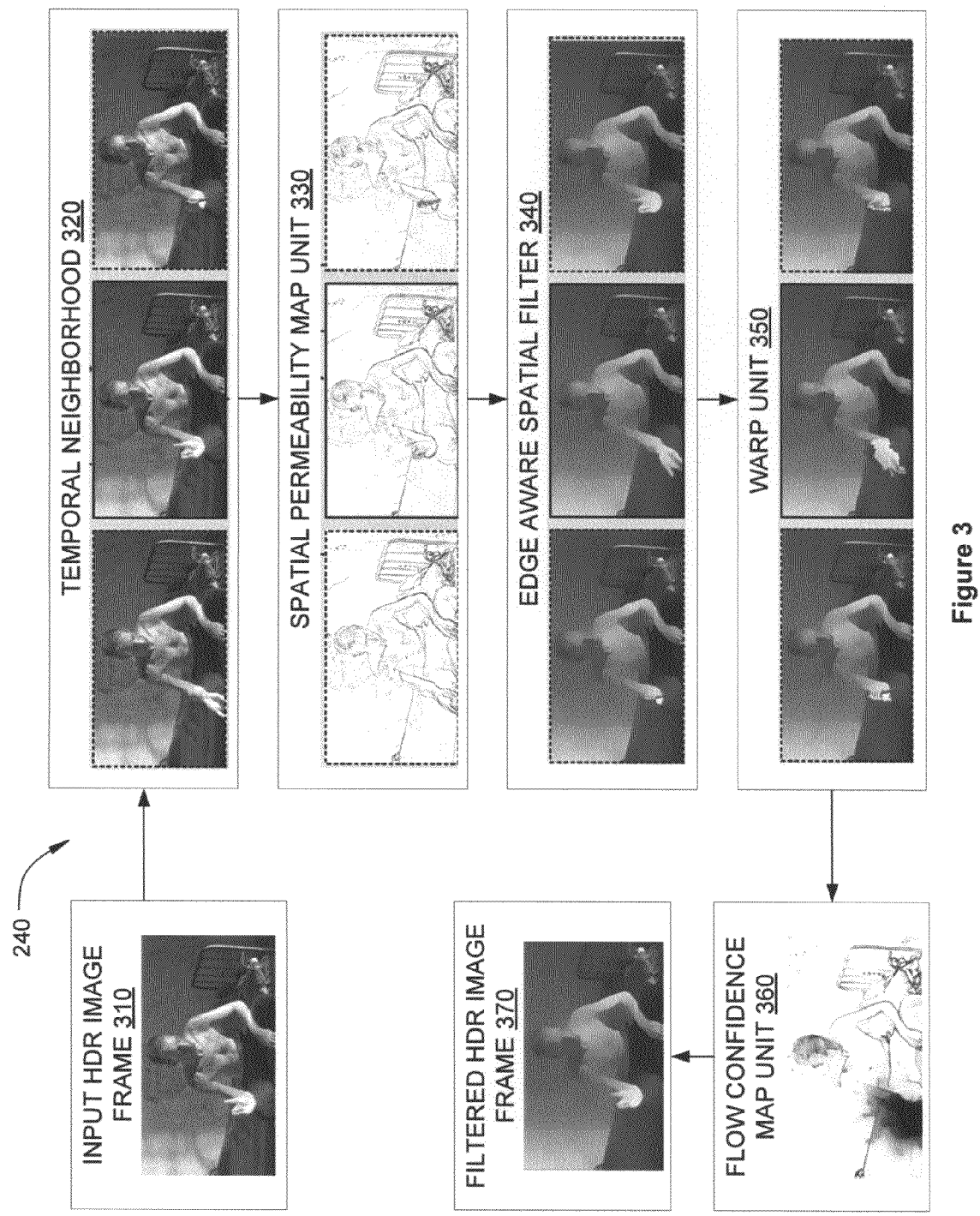
FIG. 3 illustrates the spatiotemporal filtering stage of the tone-mapping pipeline of FIG. 2, according to one embodiment.

FIG. 3 illustrates the spatiotemporal filtering 240 of the tone-mapping pipeline of FIG. 2, according to one embodiment. As shown, the spatiotemporal filtering 240 includes an input HDR image frame 310, a temporal neighborhood 320, a spatial permeability map unit 330, an edge aware spatial filter 340, a warp unit 350, a flow confidence map unit 360, and a filtered HDR image frame 370.

The input HDR image frame 310, identified as Ir, is a representation of the input HDR image 210 in the log domain. The temporal neighborhood 320 includes one or more HDR image frames that precede and follow the input HDR image frame 310. In one embodiment, the temporal neighborhood 320 includes the ten frames that immediately precede the input HDR image frame 310 and the ten frames that immediately follow the input HDR image frame 310. The temporal neighborhood 320 is transmitted to the spatial permeability map unit 330. The spatial permeability map unit 330 computes a permeability map for each frame in the temporal neighborhood 320, where the permeability map controls the spatial diffusion strength between spatially neighboring pixels. The spatial permeability map unit 330 is transmitted to the edge aware spatial filter 340.

The edge aware spatial filter 340 receives the permeability maps from the spatial permeability map unit 330. The edge aware spatial filter 340 filters the images in the temporal neighborhood 320 while preventing filtering across strong image edges, as indicated by the received permeability maps.

In particular, the edge aware spatial filter 340 iteratively applies a shift-variant spatial filter $h^s$ to image frame $J_t^{(k)}$, where k denotes the iteration, and $J_t^{(0)}=I_t$. The edge aware spatial filter 340 computes iteration (k+1) according to Equation 1 below:

$$J_t^{(k+1)} = J_t^{(k)} * h^s + \lambda(I_t - J_t^{(k)}) \qquad \text{Equation 1}$$

where λ is a spatially and temporally varying weighting factor that introduces a bias towards the original image (for reducing halo effect), and * denotes an ordinary shift-variant convolution with filter $h^s$. Based on empirical results, twenty iterations of Equation 1 is typically sufficient for generating visually plausible results. Details of the edge aware spatial filter 340 are further described herein.

The warp unit 350 begins the temporal portion of the spatiotemporal filtering 240. The warp unit 350 warps the image frames in the temporal neighborhood 320 such that all pixels in each image frame in the temporal neighborhood 320 are aligned with the corresponding pixels of the input HDR image frame 320 $I_t$. The warp unit 350 uses the forward optical flow 220 and the backward optical flow 230 to perform the warp. The warp unit 350 begins with a spatially filtered frame $J_t$ received from the edge aware spatial filter 340. Using the forward optical flow 220, the warp unit 350 stores a warp vector opposite of the vector from the forward flow field $d_{t \to (t+1)}$ that points from pixel $J_{t,p}$ to the corresponding pixel q at image frame $J_{(t+1)}$. Next, the warp unit 350 warps $J_{(t+1),q}$ using the previously stored warp vector, and updates the warp vector with the opposite of the vector at pixel q of the forward flow field $d_{(t+1) \to (t+2)}$. The warp unit 350 then warps the corresponding pixel in the next consecutive image frame $J_{(t+2)}$ with the updated warp vector. This process is repeated in the two dimensions of each image frame for all the consecutive frames of the temporal neighborhood 320 and for all pixels of image frame $J_t$. Analogously, the warp unit 350 performs the warping process in the past direction using the backward optical flow 230.

The flow confidence map unit 360 computes a flow confidence map to identify inaccuracies due to the errors and limits of the optical flow. For example, such inaccuracies could result from very rapid interframe changes, scene cuts, or sudden illumination changes, as when turning a light on or off. The confidence map prevents resulting visual artifacts by not allowing the temporal filter to perform filtering across certain pixels with a low flow confidence value. The confidence map controls the temporal diffusion strength between temporally neighboring pixels. The confidence map is analogous to the permeability map in that the confidence map prevents the filter support from growing across certain pixels. The confidence map is different from the permeability map, however, in that the confidence map supports temporal filtering while the permeability map supports spatial filtering. Another difference between the confidence map and the permeability map is that the confidence map combines a photo constancy measure with a flow derivative measure, as further described herein.

The filtered HDR image frame 370 represents the final filtered image that is spatially filtered by a spatial filter, and then temporally filtered by applying the same spatial filter in the temporal domain, by using the flow confidence map as the permeability map.

The base layer 250 is computed by performing the spatiotemporal filtering described above in conjunction with FIG. 3. The detail layer 270 is similarly computed via temporal filtering by performing the filtering described above in conjunction with FIG. 3 except for the spatial permeability map unit 330 and edge aware spatial filter 340 processing phases.

The temporal filtering process may be combined with the warping process and expressed as a shift-variant temporal convolution, according to Equation 2 below:

$$(I \star h^t)_t := (\tilde{I}_t * h^t)_t \qquad \text{Equation 2}$$

where $\tilde{I}_t(t',p)=I(t',p+d_{t \to t'})$, that is, $\tilde{I}_t$ is an image sequence, in which each frame t' is warped to t using the flow field $d_{t \to t'}$. The ★ operator denotes the shift-variant convolution with image warping. The spatiotemporal filtering term $I \star h^{st}$ differs from the temporal filtering as shown in Equation 2, in that the warped image $\tilde{I}$ is computed from the spatially filtered image J instead of I, as shown in Equation 3 below:

$$(I \star h^{st})_t := (\tilde{J}_t * h^t)_t \qquad \text{Equation 3}$$

where $\tilde{J}_t(t',p)=J(t', p+d_{t \to t'})$. Having described and formally expressed the temporal and spatiotemporal filtering operations, the base and detail layers for tone mapping may now be computed according to Equation 4 below:

$$B_t = (I \star h^{st})_t \text{ and } D_t = (I \star h^t)_t - B_t \qquad \text{Equation 4}$$

where $B_t$ represents the base layer and represents $D_t$ the detail layer. The spatial filter and the temporal filter from which the base layer and detail layer are generated are now described in greater detail below. The main advantage of iterative parallelizable filter described below executes with sub-linear runtime and generates visually similar results to the weighted least squares (WLS) filter, known for high quality, with a small number of iterations. In addition, the filter may be easily extended with additional constraints as needed, such as for temporal filtering.

Certain anisotropic smoothing filters used for image tone mapping may be expressed as a class of iterative filters, which can be represented by the iteration equation as shown in Equation 1. This iteration equation may be expressed in a slightly different form as shown in Equation 5 below:

$$J_p^{(k+1)} := \sum_{q \in \Omega} h_{pq} J_q^{(k)} + \lambda h_{pp}(I_p - J_p^{(k)}) \qquad \text{Equation 5}$$

where $I_p$ is the input image intensity at pixel position p, $J_p^{(k)}$ is the corresponding diffusion result after k iterations with $J_p^{(0)}=I_p$, matrix $H:=\{h_{pq}\}$ is a row-stochastic matrix, i.e. all matrix coefficients $h_{pq}$ are between 0 and 1, inclusive, with $\Sigma_q h_{pq}=1 \; \forall p$, and the set Ω contains all pixel positions. The iteration equation includes two addends, where the first addend is a sum that computes a weighted average at pixel position p denoted as a diffusion estimate, and where the second addend is a fidelity term controlled by a parameter λ that introduces a bias towards the input image.

The fidelity term contributes to the reduction of halo artifacts in tone mapping applications. The diffusion strength at a pixel p may be defined as $\kappa_p:=1/h_{pp}$. If the diffusion strength $\kappa_p$ is large ($h_{pp} \ll 1$), then $J_p^{(k+1)}$ is computed by strong contributions from pixels $J_q^{(k)}$ with $q \neq p$. On the other hand, if the diffusion strength $\kappa_p$ is small ($h_{pp} \approx 1$), then $J_p^{(k+1)} \approx (1-\lambda) J_p^{(k)} + \lambda I_p$, indicating that the result does not depend on pixel positions other than p and that the result represents a weighted average. In particular, if the diffusion strength is small and $\lambda=1$, then the iteration equation may be expressed by Equation 6 below:

$$J_p^{(k+1)} = I_p \qquad \text{Equation 6}$$

In other words, a parameter of $\lambda=1$ results in a strong shift towards the original image in regions of the image with low diffusion strength.

As discussed above, tone mapping applications often suffer from halo artifacts, which appear near strong image edges. If the base layer is strongly compressed during tone mapping, then deviations between the base layer and the original image near strong image edges produce these halo artifacts. Thus, the property shown in Equation 6 is highly desirable near such edges, because through such a shift towards the original image, halo artifacts may be noticeably reduced. As a result, a filter instantiation of the filter shown in Equation 5 that uses $\lambda=1$ may have a low diffusion strength in areas close to strong image edges. Artifacts may be substantially reduced in the case $\lambda=1$, since the filtering result is biased towards the stimulus signal in the area close to the step edge. On the other hand, in the case of $\lambda=0$, strong edge-aware smoothing may create significant halo artifacts in the tone mapping result. An instantiation of Equation 5 with $\lambda=0$ corresponds to the bilateral filter and the domain transform.

The result of each iteration step in Equation 5 may be efficiently computed in parallel since every $J_p^{(k+1)}$ may be computed independently of every other $J_q^{(k+1)}$. If parallel computing is applied to each iteration, an overall run-time of $O(k|\Omega|)$ may be achieved, where $|\Omega|$ is the total number of pixels and k is the quantity of iterations performed. Depending on the structure of matrix H, even faster run-times are possible, as further discussed below. Further, Perron-Frobenius and Markov chain theory show that the iteration equation converges to a non-trivial solution for $0 < \lambda \leq 1$ if all $h_{pp} \neq 0$. This property allows the convergence result to be approximated by stopping the iteration after a reasonable number of iteration steps, depending on the particular instantiation of matrix H of Equation 5.

The spatial filtering step described above using the filter formulation from Equation 5 is now described. Specifically, an iteration matrix H is constructed that leads to the desired smoothing results for tone mapping after a low quantity of iterations. The matrix H performs a strong edge-aware diffusion per iteration, while having a low diffusion strength close to significant image edges, and $\lambda$ should be 1. A strong edge-aware diffusion may be achieved in as little as one iteration, if all pixels of a connected region of similar color contribute to the diffusion result at all pixels of that region.

To derive matrix H, permeability weights are used, as derived from the spatial permeability map computation described above. The permeability between a pixel $p=(p_x,p_y)$ and the pixel's right neighbor $p'=(p_x+1,p_y)$ is defined as a variant of the Lorentzian edge-stopping function as expressed in Equation 7 below:

$$\tilde{\pi}_p := \left(1 + \left|\frac{I_p - I_{p'}}{\sigma}\right|^\alpha\right)^{-1} \qquad \text{Equation 7}$$

The permeability between p and pixel p's right neighbor pixel is near 0 if the absolute value of the corresponding intensity difference is large, and the permeability is 1 if the absolute value of the corresponding intensity difference is small. The parameter $\sigma$ indicates the point of transition from high to low permeability, while $\alpha$ controls the slope of the transition near $\sigma$. In one embodiment, $\alpha=2$ and $\sigma$ is in the range of 0.1-0.3. These permeability weights may be used to define the permeability between two arbitrary pixels p and q as shown in Equation 8 below:

$$\pi_{pq} := \begin{cases} 1: & p = q \\ \prod_{k=p_x}^{q_x-1} \tilde{\pi}_{(k,p_y)}: & p_x < q_x, p_y = q_y \\ \prod_{k=q_x}^{p_x-1} \tilde{\pi}_{(k,p_y)}: & p_x > q_x, p_y = q_y \\ 0: & \text{otherwise} \end{cases} \qquad \text{Equation 8}$$

Thus, the permeability between two pixels p and q of the same row is large if the permeability between each pair of neighboring pixels on the path between p and q is large. In particular, the permeability between p and q is significantly reduced, if there is a pair of neighboring pixels along the path with low permeability (e.g., a strong vertical edge between pixels p and q). The permeability between pixels of different rows is defined to be zero. We normalize these weights according to $$h_{pq} := \frac{\pi_{pq}}{\sum_{k=1}^{w} \pi_{(k,p_y),q}} \qquad \text{Equation 9}$$

where w is the image width to obtain a stochastic matrix $H:=\{h_{pq}\}$. The diffusion strength $\kappa_p:=1/h_{pp}$ tends to become smaller in the neighborhood of strong vertical edges, since the permeability to all pixels on the other side of the edge is close to zero.

The iteration matrix H is derived from weights describing inter-pixel permeability in the horizontal direction, as given by Equation 7. Consequently, using matrix H as derived above, diffusion may be conducted only in the horizontal direction. A second iteration matrix may be derived from permeability weights in the vertical direction, similar to the derivation of H from permeability weights between horizontal neighbors. The corresponding horizontal iteration matrix and vertical iteration matrix are denoted as $H_h$ and $H_v$, respectively. Spatial filtering is conducted according to Equation 5 by alternating between $H_h$ and $H_v$ for each iteration k and using $\lambda=1$. After each iteration, the direction of diffusion is changed allowing a rapid diffusion of intensities in connected regions of similar color. In some embodiments, horizontally neighboring pixels may include any two or more pixels on the same horizontal row. In some embodiments, vertically neighboring pixels may include any two or more pixels on the same vertical column.

Due to the structure of the iteration matrices, diffusion is conducted separately in the horizontal and in the vertical direction. Consequently, the overall run-time of the iteration is $O(kw+kh)$ where w is the width of image I, h is the height of image I, and k is the quantity of iterations. In cases where the total number of iterations is significantly smaller than (wh)=(w+h), the run-time becomes sub-linear with respect to the total number of image pixels. In one embodiment of the tone mapping pipeline described above, the quantity of iterations may be conservatively fixed to twenty for images of full HD resolution. In other embodiments, visually equivalent results may be generated with fewer iterations.

The filter formulation shown in Equation 5 may advantageously perform the temporal filtering step in the tone mapping pipeline described above. In temporal filtering, diffusion is conducted along the temporal dimension over the warped temporal neighborhood with only one iteration. The permeability weights are computed in the same way as in the spatial filtering case with help of the variant of the Lorentzian edge-stopping function, shown in Equation 7. While the computation of the temporal permeability weights is the same as in the spatial domain, the interpretation of the permeability weights is slightly different in the temporal domain. The main difference is that in the temporal domain, the permeability is also affected by the warping errors within the temporal neighborhood. The direct extension of the permeability weights to the temporal domain, where the permeability weights are obtained by applying Equation 7 to the color differences between consecutive frames, may therefore be interpreted as a photo-constancy measure. The photo-constancy measure limits the permeability at strong temporal edges, as well as regions that are erroneously warped due to incorrect optical flow.

Although the photo-constancy measure may be tuned to suppress temporal filtering at most warping errors, using a configuration that is too conservative may also suppress temporal filtering at the temporal artifacts, thereby defeating the purpose of the temporal filtering. One solution is to introduce another measure that penalizes flow vectors with high gradients, because a high gradient typically indicates regions of complex motion, where the flow estimation tends to be erroneous in such regions. Both the photo-constancy and the flow gradient measures are normalized by Equation 7, and the final permeability is obtained by multiplying the photo-constancy and the flow gradient measures. As a result, the photo-constancy constraint may be relaxed, thereby allowing regions with temporal artifacts to be permeable. In some embodiments, setting $\sigma$ in the range of 0.1-0.3 for both the photo-constancy and flow gradient measures while keeping $\alpha=2$ results in sufficient temporal filtering while still suppressing warping artifacts.

By pre-computing the base and detail layers in advance, a user may interactively adjust various tone-mapping parameters using the pre-computed base and detail layers. In a typical workflow, the user selects a value for the $\sigma^s$ parameter that controls the base layer smoothness a priori. In a first step, the $\sigma^s$ parameter and temporal filtering parameters may be efficiently set by trial and error at lower resolutions. After selecting a suitable value for the $\sigma^s$ parameter, the base and detail layers are computed at full resolution. In a second step, the user makes artistic decisions by adjusting tone mapping parameters via a graphical user interface (GUI), as described below.

Figure 4:
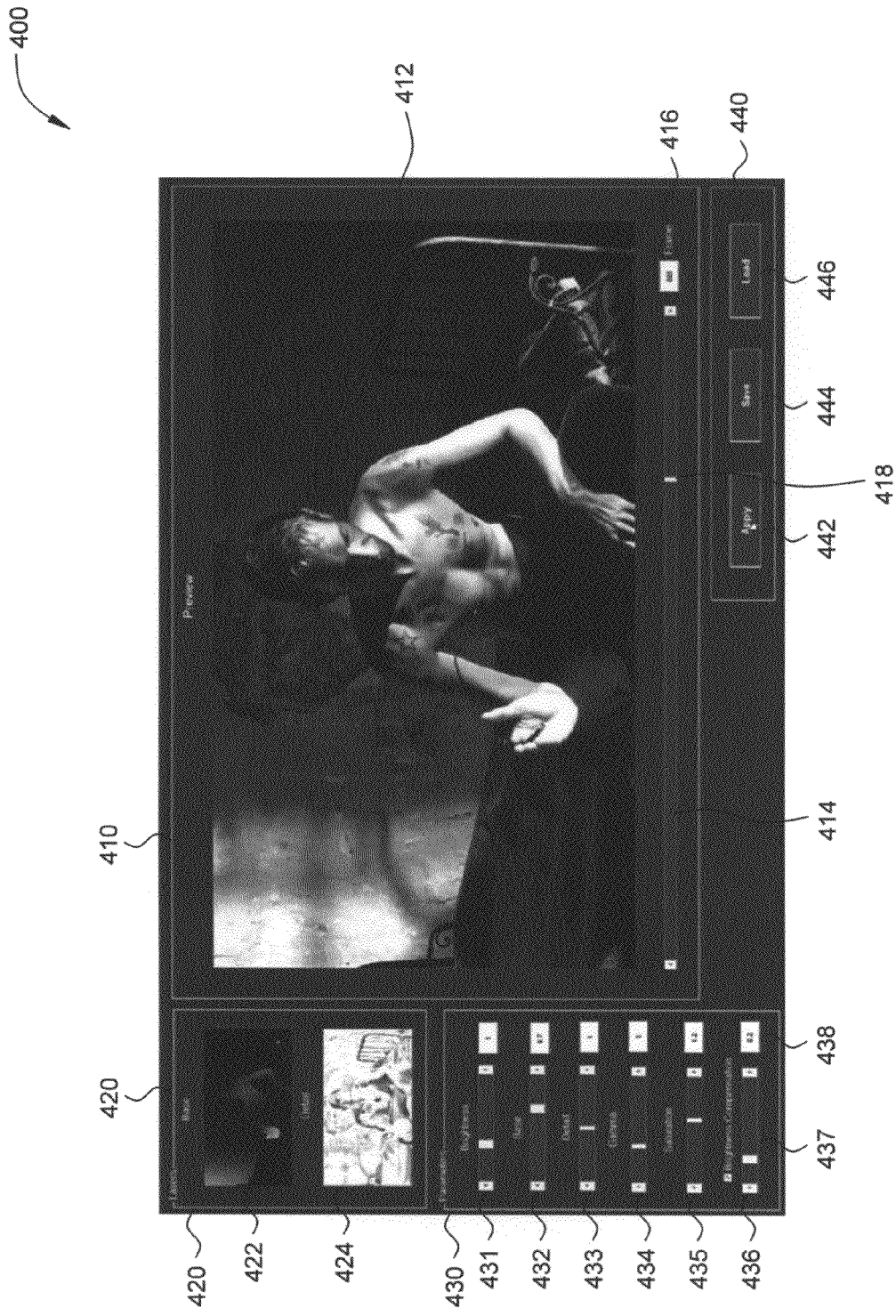
FIG. 4 illustrates a graphical user interface (GUI) screen for adjusting parameters associated with the tone-mapping pipeline of FIG. 2, according to one embodiment.

FIG. 4 illustrates a graphical user interface (GUI) screen 400 for adjusting parameters associated with the tone-mapping pipeline 200 of FIG. 2, according to one embodiment. As shown, GUI screen 400 includes a preview window 410, a layers window 420, a tone-mapping parameters window 430, and a load/save window 440.

Preview window 410 presents an image of the current image frame 412 being adjusted. A scroll bar 414 illustrates the frame position 418 of the current image frame 412 with respect to the image clip that includes the current image frame 412. The frame indicator 416 illustrates the frame number corresponding to the current image frame 412. The user may change the current image frame 412 via any technically feasible approach, including, without limitation, dragging the frame position 418 to a different location along the scroll bar 414 or entering a different frame number in the frame indicator 416.

Layers window 420 presents a base layer image 422 and a detail layer image 424 corresponding to the current image frame 412. Base layer image 422 and detail layer image 424 may be pre-computed, as described above. Alternatively, base layer image 422 and detail layer image 424 may be generated interactively when a new current image frame 412 is selected.

Tone-mapping parameters window 430 illustrates the tone mapping parameters that may be adjusted by the user. As shown, the tone-mapping parameters window 430 includes sub-windows for adjusting brightness 431, base 432, detail 433, gamma 434, saturation 435, and brightness compensation 436. The tone mapping parameters in the tone-mapping parameters window 430 may be adjusted via any technically feasible approach, including, without limitation, dragging the position to a different location along the corresponding scroll bar 437 or entering a different value in the value indicator 438. Various embodiments may include a subset or a superset of the illustrated tone-mapping parameters.

Load/save window 440 presents three buttons to the user for certain operations. An apply button 442, when selected, applies tone-parameter changes to the current image frame 412 presented in the preview window 410. A save button 444, when selected, saves the result of applying the tone-parameter changes to the image frame in the image clip that corresponds to the current image frame 412 presented in the preview window 410. A load button 446, when selected, presents a dialog box (not shown) whereby the user specifies a new image clip to load for tone-mapping adjustments.

GUI screen 400 facilitates HDR tone mapping as an artistic process, providing an interface whereby the user may experiment with tone-mapping parameters through trial and error. GUI screen 400 give visual feedback to the user at interactive refresh rates while the user adjusts the various tone mapping parameters. At smaller image resolutions, base and detail layers may be computed interactively along with adjustment of tone-mapping parameters. At larger image resolutions, the two-step approach may be used, whereby base and detail layers are pre-computed, and then the user adjusts one or more tone-mapping parameters via GUI screen 400.

It will be appreciated that the system shown herein is illustrative and that variations and modifications are possible. For example, although the spatiotemporal and temporal filters disclosed herein are described in the context of HDR image tone mapping, these filters could be applied in conjunction with any technically feasible applications, including, without limitation, temporally consistent video tone mapping, auto segmentation, and noise reduction, also referred to as "denoising," of video sequences. In the particular example of auto segmentation, an image sequence would be automatically subdivided into separate clips, based on the occurrence of scene changes, as detected by the edge-aware filter approaches described herein.

Figure 5:
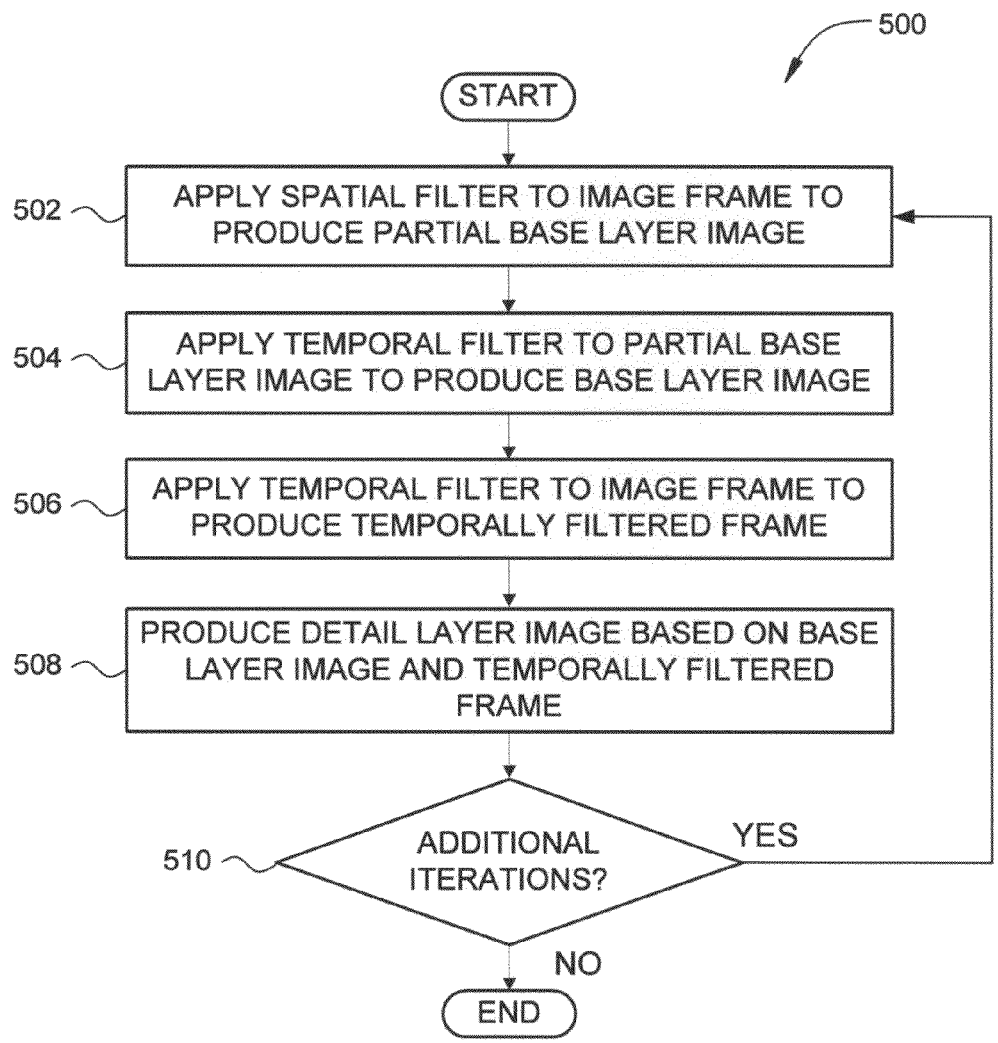
FIG. 5 sets forth a flow diagram of method steps for filtering an image frame in a sequence of image frames.

FIG. 5 sets forth a flow diagram of method steps for filtering an image frame in a sequence of image frames. Although the method steps are described in conjunction with the systems of FIGS. 1-4, persons of ordinary skill in the art will understand that any system configured to perform the method steps, in any order, is within the scope of the application.

As shown, a method 500 begins at step 502, where the tone-mapping pipeline 200 applies a spatial filter to each pixel of the first image frame to produce a partial base layer image. At step 504, the tone-mapping pipeline 200 applies a temporal filter to each pixel of the partial base layer image, based on a forward optical flow and a backward optical flow, to produce a base layer image. At step 506, the tone-mapping pipeline 200 applies a temporal filter to each pixel of the first image frame, based on the forward optical flow and the backward optical flow, to produce a temporally filtered frame. At step 508, the tone-mapping pipeline 200 produces a detail layer image based on the base layer image and the temporally filtered frame.

At step 510, the tone-mapping pipeline 200 determines whether additional iterations of steps 502 through 508. The tone-mapping pipeline 200 may make such a determination via any technically feasible approach, including, without limitation, determining whether a fixed quantity of iterations has already been performed, or determining that a point of convergence has been reached (that is, the difference in the images produced by the two most recent iteration is below a threshold difference value). If more iterations are to be performed, then the method 500 proceeds to step 502, described above. If no more iterations are to be performed, then the method 500 terminates.

Figure 6:
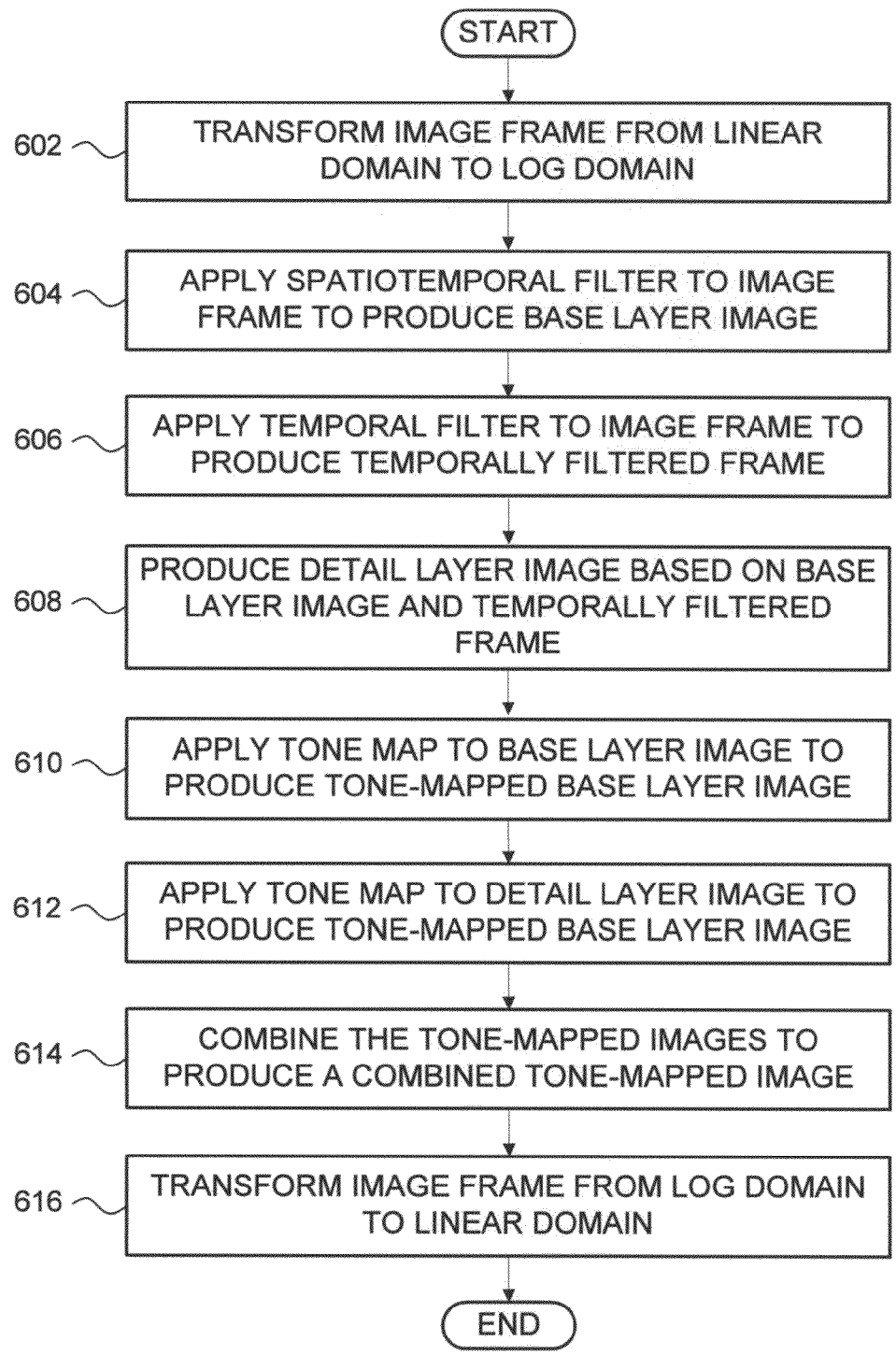
FIG. 6 sets forth a flow diagram of method steps for tone-mapping an image frame in a sequence of image frames, according to one embodiment.

FIG. 6 sets forth a flow diagram of method steps for tone-mapping an image frame in a sequence of image frames, according to one embodiment. Although the method steps are described in conjunction with the systems of FIGS. 1-4, persons of ordinary skill in the art will understand that any system configured to perform the method steps, in any order, is within the scope of the application.

As shown, a method 600 begins at step 602, where the tone-mapping pipeline 200 transforms a first image frame in the sequence of image frames from a first linear domain to a log domain to produce a second image frame. At step 604, the tone-mapping pipeline 200 applies a spatiotemporal filter to each pixel of the second image frame, based on a forward optical flow and a backward optical flow, to produce a base layer image. At step 606, the tone-mapping pipeline 200 applies a temporal filter to each pixel of the second image frame, based on the forward optical flow and the backward optical flow, to produce a temporally filtered frame. At step 608, the tone-mapping pipeline 200 produces a detail layer image based on the base layer image and the temporally filtered frame. At step 610, the tone-mapping pipeline 200 applies a first tone curve to the base layer to produce a tone-mapped base layer.

At step 612, the tone-mapping pipeline 200 applies a second tone curve to the detail layer to produce a tone-mapped detail layer. At step 614, the tone-mapping pipeline 200 combines the tone-mapped base layer with the tone-mapped detail layer to produce a tone-mapped image frame. At step 616, the tone-mapping pipeline 200 transforms the tone-mapped image frame from the log domain to a second linear domain to produce an output image frame. The method 600 then terminates.

The flowchart and block diagrams in the Figures illustrate the architecture, functionality, and operation of possible implementations of systems, methods and computer program products according to various embodiments. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order or out of order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

In sum, HDR video is separated into a base layer and a detail layer. Spatiotemporal filtering is applied to each input HDR frame and the temporal neighborhood of the input HDR frame to produce a base layer. Temporal filtering is applied to each input HDR frame and the temporal neighborhood of the input HDR frame to produce a detail layer. Image frames in the temporal neighborhood of the input HDR frame are warped such that the pixels in each neighborhood frame are aligned with the corresponding pixels of the input HDR frame. A flow confidence map is then calculated to detect errors during the warping process resulting from errors and limits of the optical flow. The filter that performed the spatial filtering is then applied in the temporal domain, based on the flow confidence map. Tone mapping is then applied to the base and detail layers to produce a final tone-mapped HDR image. In one aspect, temporal artifacts are reduced relative to HDR techniques employed for still images. In another aspect, halo artifacts are efficiently reduced relative to prior approaches.

While the foregoing is directed to embodiments of the present application, other and further embodiments of the application may be devised without departing from the basic scope thereof, and the scope thereof is determined by the claims that follow.

What is claimed is:

1. A method for filtering a first image frame in a sequence of image frames, comprising:
    applying a spatiotemporal filter to each pixel of the first image frame, based on a forward optical flow and a backward optical flow, to produce a base layer image;
    applying a first temporal filter to each pixel of the first image frame, based on the forward optical flow and the backward optical flow, to produce a temporally filtered frame, wherein at least one of the spatiotemporal filter and the first temporal filter comprises a diffusion estimate term comprising a weighted average at a first pixel position and a fidelity term that introduces a bias towards the first image frame; and
    producing a detail layer image based on the base layer image and the temporally filtered frame.

2. The method of claim 1, wherein the bias is controlled by a parameter that is multiplied by the fidelity term.

3. The method of claim 2, wherein the parameter is equal to one.

4. The method of claim 1, wherein the spatiotemporal filter and the first temporal filter are iteratively applied to the first image frame for a first quantity of iterations.

5. The method of claim 4, wherein each iteration in the first quantity of iterations is performed in parallel with every other iteration in the first quantity of iterations.

6. The method of claim 1, wherein applying the spatiotemporal filter comprises:
    applying a spatial filter to each pixel of the first image frame to produce a partial base layer image; and
    applying a second temporal filter to each pixel of the partial base layer image, based on the forward optical flow and the backward optical flow, to produce the base layer Image.

7. The method of claim 1, further comprising storing an animation file on a computer-readable medium, wherein the animation file comprises the output of the applying the spatiotemporal filter, applying the first temporal filter, and producing steps.

8. A method for filtering a first image frame in a sequence of image frames, comprising:
   applying a spatiotemporal filter to each pixel of the first image frame, based on a forward optical flow and a backward optical flow, to produce a base layer image, wherein applying the spatiotemporal filter comprises:
      applying a spatial filter to each pixel of the first image frame to produce a partial base layer image, wherein applying the spatial filter comprises computing a horizontal permeability between a first pixel in the first image frame and another pixel on the same horizontal row of pixels, and
      applying a first temporal filter to each pixel of the partial base layer image, based on the forward optical flow and the backward optical flow, to produce the base layer image;
   applying a second temporal filter to each pixel of the first image frame, based on the forward optical flow and the backward optical flow, to produce a temporally filtered frame; and
   producing a detail layer image based on the base layer image and the temporally filtered frame.

9. A method for filtering a first image frame in a sequence of image frames, comprising:
   applying a spatiotemporal filter to each pixel of the first image frame, based on a forward optical flow and a backward optical flow, to produce a base layer image, wherein applying the spatiotemporal filter comprises:
      applying a spatial filter to each pixel of the first image frame to produce a partial base layer image, wherein applying the spatial filter comprises computing a vertical permeability between a first pixel in the first image frame and another pixel on the same vertical column of pixels, and
      applying a first temporal filter to each pixel of the partial base layer image, based on the forward optical flow and the backward optical flow, to produce the base layer image;
   applying a second temporal filter to each pixel of the first image frame, based on the forward optical flow and the backward optical flow, to produce a temporally filtered frame; and
   producing a detail layer image based on the base layer image and the temporally filtered frame.

10. A method for filtering a first image frame in a sequence of image frames, comprising:
    applying a spatiotemporal filter to each pixel of the first image frame, based on a forward optical flow and a backward optical flow, to produce a base layer image, wherein applying the spatiotemporal filter comprises:
    applying a first temporal filter to each pixel of the first image frame, based on the forward optical flow and the backward optical flow, to produce a temporally filtered frame, wherein applying the first temporal filter comprises computing a temporal permeability between a first pixel in the first image frame and at least one of a first corresponding pixel in a first warped image frame of a previous image frame and a second corresponding pixel in a second warped image frame of a later image frame; and
    producing a detail layer image based on the base layer image and the temporally filtered frame.

11. A non-transitory computer-readable storage medium including instructions that, when executed by a processor, cause the processor to filter a first image frame in a sequence of image frames, by performing an operation comprising:
    applying a spatiotemporal filter to each pixel of the first image frame, based on a forward optical flow and a backward optical flow, to produce a base layer image;
    applying a first temporal filter to each pixel of the first image frame, based on the forward optical flow and the backward optical flow, to produce a temporally filtered frame, wherein at least one of the spatiotemporal filter and the first temporal filter comprises a diffusion estimate term comprising a weighted average at a first pixel position and a fidelity term that introduces a bias towards the first image frame; and
    producing a detail layer image based on the base layer image and the temporally filtered frame.

12. The non-transitory computer-readable storage medium of claim 11, wherein the bias is controlled by a parameter that is multiplied by the fidelity term.

13. The non-transitory computer-readable storage medium of claim 12, wherein the parameter is equal to one.

14. The non-transitory computer-readable storage medium of claim 11, wherein the spatiotemporal filter and the first temporal filter are iteratively applied to the first image frame for a first quantity of iterations.

15. The non-transitory computer-readable storage medium of claim 14, wherein each iteration in the first quantity of iterations is performed in parallel with every other iteration in the first quantity of iterations.

16. The non-transitory computer-readable storage medium of claim 11, wherein applying the spatiotemporal filter comprises:
    applying a spatial filter to each pixel of the first image frame to produce a partial base layer image; and
    applying a second temporal filter to each pixel of the partial base layer image, based on the forward optical flow and the backward optical flow, to produce the base layer image.

17. The non-transitory computer-readable storage medium of claim 11, wherein the operation further comprises storing an animation file on a computer-readable medium, wherein the animation file comprises the output of the applying the spatiotemporal filter, applying the first temporal filter, and producing steps.

* * * * *